(12) United States Patent
Buhrke

(10) Patent No.: US 11,491,829 B2
(45) Date of Patent: Nov. 8, 2022

(54) METHOD FOR ACTUATING A TIRE-PRESSURE REGULATING SYSTEM OF AN AGRICULTURAL VEHICLE COMBINATION

(71) Applicant: DEERE & COMPANY, Moline, IL (US)

(72) Inventor: Frank Buhrke, Birkenau (DE)

(73) Assignee: DEERE & COMPANY, Moline, IL (US)

( * ) Notice: Subject to any disclaimer, the term of this patent is extended or adjusted under 35 U.S.C. 154(b) by 353 days.

(21) Appl. No.: 16/903,408

(22) Filed: Jun. 17, 2020

(65) Prior Publication Data

US 2021/0008934 A1   Jan. 14, 2021

(30) Foreign Application Priority Data

Jul. 12, 2019 (DE) .......................... 102019210325.1

(51) Int. Cl.
*B60C 23/02* (2006.01)
*B60C 23/08* (2006.01)
*B60C 23/00* (2006.01)

(52) U.S. Cl.
CPC ............ *B60C 23/002* (2013.01); *B60C 23/08* (2013.01); *B60C 2200/08* (2013.01)

(58) Field of Classification Search
CPC ............ B60C 23/0408; B60C 23/0496; B60C 23/061; B60C 23/0494; B60C 23/0416; B60C 23/0433; B60C 23/0493; B60C 19/00; B60C 23/04; B60C 23/041; B60C 23/0411; B60C 23/0462; B60C 23/20; B60C 23/0444; B60C 11/24; B60C 23/0479; B60C 23/064; B60C 23/007; B60C 23/062; B60C 23/0401; B60C 23/0413; B60C 23/0488; B60C 23/06; B60C 23/043; B60C 23/0452;
(Continued)

(56) References Cited

U.S. PATENT DOCUMENTS 10,442,256 B2   10/2019  Baum et al.
10,464,379 B2*  11/2019  Hennig ................. B60C 23/002
(Continued)

FOREIGN PATENT DOCUMENTS

DE   102007035647 A1   1/2009
DE   202011051292 U1   2/2012
(Continued)

OTHER PUBLICATIONS

European Search Report issued in counterpart application No. 20183262.3 dated Dec. 8, 2020 (05 pages).

*Primary Examiner* — Andre J Allen

(57) ABSTRACT

A method for actuating a tire-pressure regulating system of an agricultural vehicle combination includes monitoring a current operating status of an implement by a control unit and receiving data by the control unit indicative of a change in the current operating status of the implement. The method also includes communicating a command by the control unit to a tire-pressure regulating system of the change in the current operating status and controllably adjusting a tire inflation pressure in one or more tires of a tractor or the implement by the tire-pressure regulating system based on the data received by the control unit.

20 Claims, 2 Drawing Sheets

(58) Field of Classification Search
CPC .............. B60C 23/0467; B60C 11/246; B60C
23/0498; B60C 23/02; B60C 99/006;
B60C 23/0428; B60C 23/0442; B60C
23/009; B60C 2019/004; B60C 23/0425;
B60C 11/243; B60C 23/004; B60C
23/00354; B60C 23/045; B60C 23/0464;
B60C 23/003; B60C 23/00318; B60C
23/0472; B60C 23/066; B60C 23/00372;
B60C 23/0403; B60C 23/04985; B60C
23/0406; B60C 29/02; B60C 11/00; B60C
23/006; B60C 23/00; B60C 23/044; B60C
23/008; B60C 23/0455; B60C 23/0454;
B60C 23/0483; B60C 23/0461; B60C
23/0474; B60C 23/0415; B60C 23/0491;
B60C 23/0489; B60C 25/002; B60C
29/064; B60C 23/00363; B60C 11/0318;
B60C 23/0459; B60C 23/0471; B60C
23/0481; B60C 2019/005; B60C 23/002;
B60C 23/042; B60C 2200/02; B60C
23/0422; B60C 23/0423; B60C 23/0466;
B60C 23/0405; B60C 23/0477; B60C
29/06; B60C 13/001; B60C 23/0437;
B60C 23/0476; B60C 25/132; B60C
23/0447; B60C 23/0427; B60C 23/0449;
B60C 25/00; B60C 9/18; B60C 13/00;
B60C 19/003; B60C 23/0484; B60C
23/065; B60C 23/00336; B60C 23/0486;
B60C 23/08; B60C 17/00; B60C
2019/006; B60C 23/001; B60C 25/142;
B60C 17/02; B60C 23/00345; B60C
23/0445; B60C 5/004; B60C 11/0083;
B60C 25/145; B60C 29/00; B60C 9/02;
B60C 11/0332; B60C 23/0457; B60C
23/12; B60C 25/18; B60C 11/13; B60C
23/0418; B60C 23/0469; B60C 29/066;
B60C 23/068; B60C 25/005; B60C
25/138; B60C 11/03; B60C 23/005; B60C
23/0432; B60C 3/00; B60C 5/14; B60C
99/00; B60C 11/11; B60C 17/04; B60C
17/06; B60C 23/063; B60C 23/10; B60C
25/007; B60C 25/0554; B60C 25/14;
B60C 29/062; B60C 99/003; B60C
11/032; B60C 11/12; B60C 13/003; B60C
19/001; B60C 23/0435; B60C 23/127;
B60C 23/16; B60C 29/068; B60C 3/04;
B60C 9/20; B60C 11/01; B60C 11/0302;
B60C 13/02; B60C 23/126; B60C 25/056;
B60C 29/005; B60C 29/04; B60C 5/142;
B60C 11/0304; B60C 11/0306; B60C
15/06; B60C 2009/2038; B60C
2011/0374; B60C 2011/0388; B60C
2011/1213; B60C 2011/1231; B60C
2011/1245; B60C 2200/065; B60C
23/00305; B60C 23/067; B60C 23/135;
B60C 23/137; B60C 23/18; B60C 25/02;
B60C 7/12; B60C 11/02; B60C 17/0009;
B60C 19/002; B60C 19/08; B60C 19/12;
B60C 2019/007; B60C 23/00347; B60C
23/131; B60C 25/05; B60C 5/001; B60C
5/22; B60C 1/0008; B60C 1/0016; B60C
11/0058; B60C 11/0311; B60C 11/033;
B60C 11/1218; B60C 11/124; B60C
11/1384; B60C 13/04; B60C 15/0036;
B60C 15/024; B60C 17/041; B60C
17/066; B60C 2007/005; B60C
2009/0071; B60C 2009/2022; B60C
2009/2025; B60C 2011/0358; B60C
2011/1254; B60C 2017/068; B60C
2200/06; B60C 2200/12; B60C 2200/14;
B60C 23/121; B60C 23/123; B60C
23/133; B60C 25/0503; B60C 25/0515;
B60C 25/0521; B60C 25/0551; B60C
25/15; B60C 25/16; B60C 29/007; B60C
3/06; B60C 5/002; B60C 5/02; B60C
5/20; B60C 7/00; B60C 7/105; B60C
9/005; B60C 9/1807; B60C 9/28; B60C
2011/0033; B60C 23/085; B60C 25/0548;
B60C 25/185; B60C 7/107; B60C 9/22
USPC .................................................. 73/146–146.8
See application file for complete search history.

(56) References Cited

U.S. PATENT DOCUMENTS

| | | | |
|---|---|---|---|
| 10,562,358 | B2 | 2/2020 | Baum et al. |
| 10,676,141 | B2 | 6/2020 | Schott et al. |
| 2017/0253093 | A1 | 9/2017 | Baum et al. |
| 2020/0139772 | A1* | 5/2020 | Vogelpohl ......... B60C 23/00345 |
| 2020/0254829 | A1 | 8/2020 | Schott et al. |
| 2021/0016611 | A1* | 1/2021 | Bechthold ......... B60C 23/00372 |
| 2021/0237520 | A1* | 8/2021 | Ehlert .................. B60C 23/002 |

FOREIGN PATENT DOCUMENTS

| | | |
|---|---|---|
| DE | 102011085041 A1 | 4/2013 |
| DE | 102016203689 A1 | 9/2017 |
| DE | 102017205827 A1 | 10/2018 |
| DE | 102019003345 A1 | 11/2020 |
| EP | 3415345 A1 | 12/2018 |
| EP | 3738796 A1 | 11/2020 |

* cited by examiner

… …

METHOD FOR ACTUATING A TIRE-PRESSURE REGULATING SYSTEM OF AN AGRICULTURAL VEHICLE COMBINATION

RELATED APPLICATIONS

This application claims priority to German Patent Application Ser. No. 102019210325.1, filed Jul. 12, 2019, the disclosure of which is hereby incorporated by reference in its entirety.

FIELD OF THE DISCLOSURE

The present disclosure relates to a method for actuating a tire-pressure regulating system of an agricultural vehicle combination including an agricultural tractor and a towed implement attached thereto.

BACKGROUND

A method for actuating a tire-pressure regulating system of an off-road vehicle is known, for example, from DE 20 2011 051 292 U1, in which a control unit decides, on the basis of a sensed geoposition, whether the vehicle is currently off-road or on a road in order to apply a respectively suitable tire air-pressure to the tires of the vehicle by actuation of a tire-pressure regulating system. The method takes account of the fact that, during off-road operation, excessively high tire air-pressure leads to excessive compaction of the ground, whereas, during on-road operation, insufficient tire air-pressure leads to excessive flexing which increases tire wear. The proposed operation-dependent adaptation of tire inflation pressure therefore makes it possible to significantly reduce the risk of vehicle operation using a tire air pressure that is unsuitable for off-road or on-road travel. However, the proposed procedure is comparatively complex, since not only is knowledge of the current geoposition of the vehicle a prerequisite, but also its comparison with cartographic information relevant for off-road or on-road operation.

There is a need therefore for a method that is simplified in respect of identifying a change between on-road and off-road operation.

SUMMARY

According to the present disclosure, a method for actuating a tire-pressure regulating system of an agricultural vehicle combination including an agricultural tractor and a towed implement attached thereto provides that an increase or a reduction in a tire inflation pressure present in air-filled tires of the agricultural tractor or the implement is initiated by a control unit by actuation of the tire-pressure regulating system in the event that the control unit identifies, by evaluation of data indicating a current operating status of the implement, that a change from field to road operation, or a change from road to field operation, is imminent or forthcoming.

The data indicating the current operating status of the implement may be available, for example, in the form of corresponding sensor data on an ISOBUS intended for controlling the implement. However, it may also be corresponding driver's control commands, which are entered manually via a user interface arranged on the agricultural tractor.

In this way, it is possible to identify an intended change between field and road operation independently of knowledge of the current geographical position of the agricultural vehicle combination, or cartographic information.

Generally, the tire-pressure regulating system is an integral part of the agricultural tractor, and can be used to pressurize the air-filled tires of both the agricultural tractor and the towed implement. Alternatively, the implement has its own tire-pressure regulating system, which can be controlled, in particular via the ISOBUS, from the control unit of the agricultural tractor.

The data may represent the current fill level of an agricultural material that is stored in a tank of the implement and that can be applied by the implement. Thus, a slurry level in the tank that is below a preset minimum value indicates imminent departure from the field, i.e., cessation of field operation and thus the imminent start of road operation. The fill level is sensed, for example, by a fill-level sensor arranged in the tank, and transmitted, in the form of corresponding sensor data, via ISOBUS to the control unit of the agricultural tractor. The agricultural material may be, inter alia, seeds, fertilizer in the form of a granulate, liquid spray for plant treatment or weed killing, slurry or the like. Accordingly, the implement is realized as a seed drill, fertilizer spreader, sprayer or slurry tank.

In the case of an implement realized as a loader wagon, the reverse case is also conceivable; in this case, if a full load of harvested crop is identified, it is to be expected that it will depart from the field and commence a subsequent road journey for the purpose of removal.

Furthermore, it is possible for the data to represent information regarding a current operating position of an item of work equipment comprised by the implement. Such an item of work equipment may be constituted, for example, by a foldable sprayer boom that is part of a sprayer, and on which a multiplicity of spray nozzles are arranged for applying a liquid spray. In this case, a folding-out of the sprayer boom reliably indicates an imminent field operation, whereas a folding-in usually occurs shortly before commencement of a road operation. The respective operating position may be recognized by the control unit on the basis of a corresponding driver's operating command via the user interface arranged in the agricultural tractor. Depending on whether the sprayer boom is folded in or out, the control unit initiates a corresponding increase or decrease of the tire inflation pressure by actuation of the tire-pressure regulating system.

In order to take account of the time required for a tire pressure adaptation to be effected by the tire-pressure regulating system, it is advantageous for the control unit to include cartographic information from a preceding transport route upon a change from field to road operation, in respect of the time of initiation of a tire inflation pressure increase. This information may be obtained by the control unit from an ascertained current geographical position of the agricultural vehicle combination by comparison with a cartographically recorded course of the transport route. The increase in the tire inflation pressure to the value intended for road operation is then initiated by the control unit in such good time that the tire pressure regulation process is completed by the time the transport route is reached. This ensures an uninterrupted commencement of road operation. Such an anticipatory initiation of the tire-pressure regulation process may be limited to an increase in the tire inflation pressure, since, for design-related reasons, the inflation times of the tire-pressure regulating system are usually disproportionately higher than the deflation times in the case of a tire inflation pressure reduction.

The above considerations relate mainly to criteria that indicate the need to adapt the tire inflation pressure. In the actual calculation of the extent of the increase or decrease in tire inflation pressure to be effected in this respect, the control unit may take into account a drawbar load exerted upon the agricultural tractor by the implement or a wheel contact force on the implement. The drawbar load in this case is typically exerted via a coupling jaw at the rear of the agricultural tractor, to which the implement is separably attached by a drawbar. The drawbar load results in a corresponding alteration of the wheel contact forces, in particular on a rear axle of the agricultural tractor, and must be taken into account accordingly in the calculation of the tire inflation pressure to be set in a particular case. The drawbar load exerted upon the agricultural tractor, and also the wheel contact force on the implement, depends largely, in particular, on the fill level of an agricultural material to be applied and stored in an associated tank, and can be estimated by evaluation of the sensor data of a fill-level sensor.

Nevertheless, it is also conceivable for the drawbar load, and also the wheel contact force, to be ascertained on the implement side by corresponding force sensors or the like, and for this information to be communicated to the control unit via the ISOBUS together with information regarding the tire model or type used. The latter significantly affects the tire inflation pressure to be applied on the implement in order to achieve a particular tire contact area.

Instead of transmission via the ISOBUS, it is also possible for the information relating to the tire model or type to be stored in a memory unit assigned to the control unit and, when the ISOBUS connection is established, to be automatically retrieved from the memory unit by identification of the respective implement and used as a basis for adaptation of the tire inflation pressure. With regard to the agricultural tractor, the determination of the tire inflation pressure to be set may be effected with additional consideration of a ballasting proposal determined in accordance with DE 10 2017 205 827 A1. A tractive power requirement, resulting from the respective fill level of the implement, may also be included for the purpose of continuously adapting the tire inflation pressure on the agricultural tractor.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawing, wherein.

Corresponding reference numerals are used to indicate corresponding parts in the drawings.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
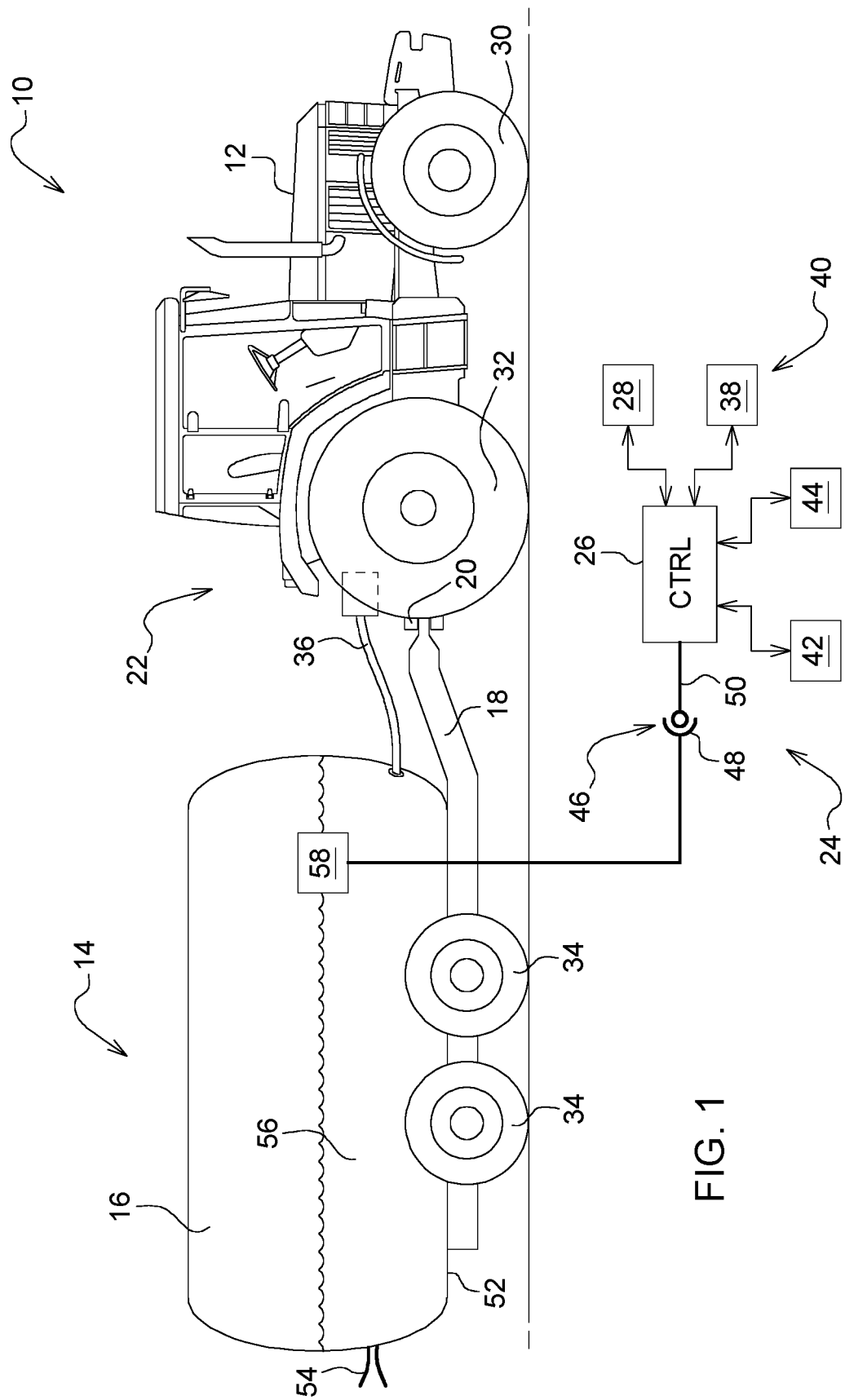
FIG. 1 is a schematic of an agricultural vehicle combination including an agricultural tractor and an implement formed as a slurry tank.

FIG. 1 illustrates the functioning of a first embodiment of a method according to the present disclosure for an agricultural vehicle combination 10 comprising an agricultural tractor 12 and a towed implement 14, attached thereto, in the form of a slurry tank 16. The slurry tank 16 is separably attached to a coupling jaw 20 in the rear region of the agricultural tractor 12 by a drawbar 18.

An arrangement or control system 24 assigned to or forming part of the agricultural tractor 12 serves to execute the method according to the disclosure. The arrangement or control system 24 may include a microprocessor-controlled control unit 26 and a tire-pressure regulating system 28, which serves to set for each wheel an individual tire inflation pressure in the air-filled tires 30, 32, 34 of the agricultural tractor 12 and of the slurry tank 16 (only those facing the observer are shown). For this purpose, the tires 34 of the slurry tank 16 communicate with the tire-pressure regulating system 28 via a pressure hose 36 that can be connected in the rear region 22 of the agricultural tractor 12.

Furthermore, there is a user interface 40 disclosed, for example, as a touch-sensitive display unit 38, a GPS receiver 42 for ascertaining a current geographical position of the agricultural vehicle combination 10, as well as a memory unit 44, having cartographic information stored therein regarding a course of transport routes and the like.

As an example, the slurry tank 16 is an ISOBUS-enabled implement 14. An interface 46, in the form of a standard ISOBUS plug connector 48 that is part of the arrangement or control system 24 in this case establishes a data exchange connection with the control unit 26. On the ISOBUS 50 there is, inter alia, data on the current fill level of the slurry 56 that is stored in a tank 52 of the slurry tank 16 and that can be spread by a spreader nozzle 54. The fill level is sensed by a fill-level sensor 58 arranged in the tank 52 and transmitted, in the form of corresponding sensor data, via the ISOBUS 50 to the control unit 26 of the agricultural tractor 12, such that it receives an immediate indication of the current operating status of the slurry tank 16.

In departure from the illustration in FIG. 1, the slurry tank 16 may also be assigned its own tire-pressure regulating system 28. This can then be actuated via the ISOBUS 50 from the control unit 26 of the agricultural tractor 12.

If the control unit 26 identifies, by evaluation of the sensor data, that the fill level of the slurry 56 in the tank 52 is below a preset minimum value, this indicates imminent departure from the field, i.e., cessation of field operation and thus the imminent start of road operation. In such a case, the control unit 26, by actuating the tire-pressure regulating system 28, causes an increase in the inflation pressure of the tires 30, 32, 34 of both the agricultural tractor 12 and the slurry tank 16. The preset minimum value in this case may correspond to an empty, or almost empty, tank 52.

In order to take account of the time required for a tire pressure adaptation to be effected by the tire-pressure regulating system 28, the control unit 26 includes cartographic information from a preceding transport route upon a change from field to road operation in respect of the time of initiation of a tire inflation pressure increase. This information is obtained by the control unit 26 from the current geographical position of the agricultural vehicle combination 10, ascertained by the GPS receiver 42, by comparison with the cartographic information stored in the memory unit 44. The increase in the tire inflation pressure to the value intended for road operation is then initiated by the control unit 26 in such good time that the tire-pressure regulation process is completed by the time the transport route is reached. This ensures an uninterrupted commencement of road operation.

In the calculation of the extent of the increase or decrease in tire inflation pressure, the control unit 26 takes into account a drawbar load exerted upon the agricultural tractor 12 by the slurry tank 16 or a wheel contact force on the implement 14. Both values depend on the current fill level of the tank 52. In the present case, an at least substantially empty tank 52, at the end of field operation, may be assumed such that the empty weight of the slurry tank 16 is used in determination of the drawbar load or wheel contact force. With regard to the agricultural tractor, the determination of the tire inflation pressure to be set may then be effected with additional consideration of a ballasting proposal determined in accordance with DE 10 2017 205 827 A1.

Figure 2:
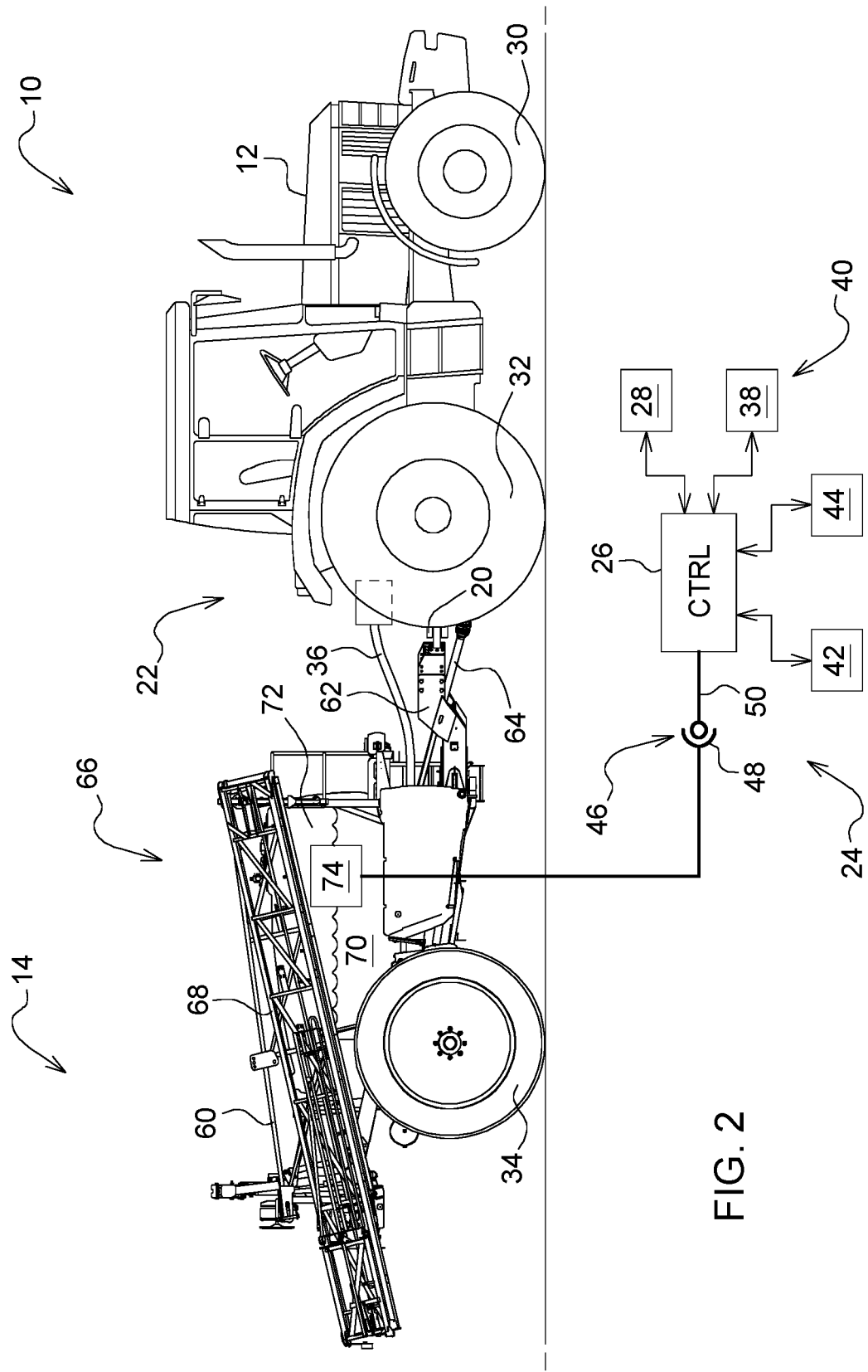
FIG. 2 is a schematic of an agricultural vehicle combination including an agricultural tractor and an appliance formed as a sprayer.

FIG. 2 illustrates the functioning of a second embodiment of the method according to the present disclosure, where the implement 14 is now shown as comprising a sprayer 60 that, on the one hand, is separably attached to the coupling jaw 20 in the rear region 22 of the agricultural tractor 12 by a drawbar 62 and, on the other hand, is connected to the latter on the drive side via a power take-off shaft 64.

The agricultural tractor 12, as well as the arrangement or control system 24 included in it, are unchanged in structural design with respect to first embodiment. However, the sprayer 60 has an item of work equipment 66 in the form of a foldable sprayer boom 68, on which a multiplicity of spray nozzles 70 are arranged for the application of a liquid spray 70, which is stored in a spray tank 72. A folding-out of the sprayer boom 68 in this case indicates an imminent field operation, whereas a folding-in usually occurs shortly before the commencement of road operation. The operating position of the sprayer boom 68, in addition to the fill level of the spray tank 72 monitored by a fill-level sensor 74, thus provides an indication of the current operating status of the sprayer 60. The respective operating position is identified by the control unit 26 on the basis of a corresponding driver's operating command, via the user interface 40 arranged in the agricultural tractor 12. Depending on whether the sprayer boom 68 is folded in or out, the control unit 26 simultaneously initiates a corresponding increase or decrease in the tire inflation pressure by actuation of the tire-pressure regulating system 28.

With regard to the inclusion of the fill level of the spray tank 72 in the actuation of the tire-pressure regulating system 28, reference is also made in similar manner to the description above related to the first embodiment.

While embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for actuating a tire-pressure regulating system of an agricultural vehicle combination, comprising:
providing an agricultural tractor, a towed implement coupled to the tractor, and a control unit;
monitoring a current operating status of the implement by the control unit, where the implement operates in at least a field operation mode and a road operation mode;
receiving data by the control unit indicative of a change in the current operating status of the implement;
communicating a command by the control unit to the tire-pressure regulating system of the change in the current operating status; and
controllably adjusting a tire inflation pressure in one or more tires of the tractor or implement by the tire-pressure regulating system based on the data received by the control unit.

2. The method of claim 1, wherein the controllably adjusting step comprises increasing the tire inflation pressure when changing to the road operation mode.

3. The method of claim 1, wherein the controllably adjusting step comprises decreasing the tire inflation pressure when changing to the field operation mode.

4. The method of claim 1, further comprising:
providing a sensor in fluid communication with a fluid level in a tank of the implement;
detecting the fluid level with the sensor;
communicating the fluid level to the control unit;
comparing the fluid level to a fluid level threshold; and
determining the change in the current operating status based on the comparing step.

5. The method of claim 4, further comprising determining the current operating status is changing when the fluid level satisfies the fluid level threshold.

6. The method of claim 1, further comprising determining a current operating position of the implement;
wherein the receiving step comprises receiving data indicating the current operating position of the implement is changing from a first operating position to a second operating position.

7. The method of claim 6, wherein the first operating position corresponds to the field operation mode and the second operating position corresponds to the road operation mode.

8. The method of claim 1, further comprising:
determining a drawbar load exerted by the implement on the tractor; and
calculating an amount to increase or decrease the tire inflation pressure based on the drawbar load.

9. The method of claim 1, further comprising:
determining a wheel contact force on the implement; and
calculating an amount to increase or decrease the tire inflation pressure based on the wheel contact force.

10. The method of claim 1, further comprising:
ascertaining a current geographical position of the combination with a GPS receiver;
storing cartographic information in a memory unit from a preceding transport route upon a change from field to road operation; and
determining an amount of time to increase the tire inflation pressure based on the current geographical position and the cartographic information.

11. A method for actuating a tire-pressure regulating system of an agricultural vehicle combination, comprising:
providing an agricultural tractor, an implement coupled to the tractor, a control unit, a sensor, a GPS receiver, and a memory unit;
evaluating a current operating status of the implement by the control unit;

detecting a status change of the implement by the sensor;

communicating the status change to the control unit;

determining an amount of time to adjust a tire inflation pressure of at least one tire on the tractor or the implement before the current operating status changes to a new operating status; and adjusting the tire inflation pressure in the at least one tire by the tire-pressure regulating system before the current operating status changes to the new operating status.

12. The method of claim 11, wherein the adjusting step comprises increasing the tire inflation pressure when the new operating status comprises a road operation mode.

13. The method of claim 11, wherein the adjusting step comprises decreasing the tire inflation pressure when the new operating status comprises a field operation mode.

14. The method of claim 11, further comprising:

providing the implement with a tank for holding a material to be released therefrom;

detecting an amount of the material in the tank with the sensor;

communicating the amount to the control unit;

comparing the amount to a threshold amount; and determining the change in the current operating status to the new operating status based on the comparing step.

15. The method of claim 11, wherein:

the detecting step comprises detecting a change in an operating position of the implement from a first operating position to a second operating position;

communicating the change in the operating position to the control unit; and executing the adjusting step based on the change in the operating position of the implement.

16. The method of claim 11, further comprising:

determining a drawbar load exerted by the implement on the tractor; and calculating an amount to increase or decrease the tire inflation pressure based on the drawbar load.

17. The method of claim 11, further comprising:

determining a wheel contact force on the implement; and calculating an amount to increase or decrease the tire inflation pressure based on the wheel contact force.

18. The method of claim 11, further comprising:

ascertaining a current geographical position of the combination with the GPS receiver;

storing cartographic information in the memory unit from a preceding transport route upon a change from a field operation to a road operation; and executing the adjusting step based on an amount of time to increase the tire inflation pressure as a function of the current geographical position and the cartographic information.

19. An agricultural tractor-implement system, comprising:

a tractor comprising at least one tire;

an implement comprising at least one tire;

a drawbar coupling the implement to the tractor;

a control system comprising a control unit and a sensor, the sensor configured to detect an operating status of the implement; and a tire-pressure regulating system operably coupled to the control unit and the at least one tires of the tractor and implement, the tire-pressure regulating system configured to adjust an inflation pressure of each tire;

wherein, the control unit receives a signal from the sensor indicative of a change in the operating status of the implement from a first operating status to a second operating status;

wherein, the control unit operably activates the tire-pressure regulating system to increase or decrease the inflation pressure of each tire before the operating status of the implement reaches the second operating status.

20. The system of claim 19, wherein:

the tire-pressure regulating system operably increases the inflation pressure of each tire when the second operating status corresponds to a road operating mode; and the tire-pressure regulating system operably decreases the inflation pressure of each tire when the second operating status corresponds to a field operating mode.

* * * * *